United States Patent [19]
Sugiyama et al.

[11] Patent Number: 4,779,255
[45] Date of Patent: Oct. 18, 1988

[54] OPTICAL READING/REPRODUCING APPARATUS

[75] Inventors: Toshio Sugiyama, Aichi; Hideo Suenaga, Toyokawa, both of Japan

[73] Assignee: Hitachi, Ltd., Tokyo, Japan

[21] Appl. No.: 861,003

[22] Filed: May 8, 1986

[30] Foreign Application Priority Data

May 20, 1985 [JP] Japan .................. 60-105823

[51] Int. Cl.$^4$ .............................................. G11B 7/09
[52] U.S. Cl. ........................................ 369/45; 369/44; 369/46; 250/201
[58] Field of Search .................. 369/44, 45, 46, 111, 369/120, 112; 250/201

[56] References Cited

U.S. PATENT DOCUMENTS

| | | | |
|---|---|---|---|
| 4,293,944 | 10/1981 | Izumita | 369/45 |
| 4,296,316 | 10/1981 | Tsuji | 369/45 |
| 4,358,200 | 11/1982 | Heemsherk | 369/45 |
| 4,607,157 | 8/1986 | Millar | 369/45 |

FOREIGN PATENT DOCUMENTS 167863  9/1984  Japan ............................. 369/45

*Primary Examiner*—Alan Faber
*Attorney, Agent, or Firm*—Antonelli, Terry & Wands

[57] ABSTRACT

An optical reading/reproducing apparatus such as a compact disc (CD) player, and particularly a focusing system therefor, wherein the direction of one of the focal lines of the light spot on a light detector is set to be in parallel with the direction of track on the disc surface, a divide-into-four line of the light detector is set to be 45 degrees or a value close thereto with respect to the track direction, and an offset voltage is applied to a portion of the focus servo loop connected with the output unit of a focus error detector circuit. Owing to this structure, the optical parts can be easily mounted, a casing for containing them can be easily molded, and the apparatus can be mass-produced in small sizes.

3 Claims, 2 Drawing Sheets

FIG. 4
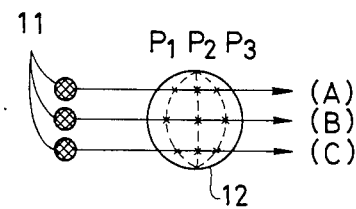
FIG. 8
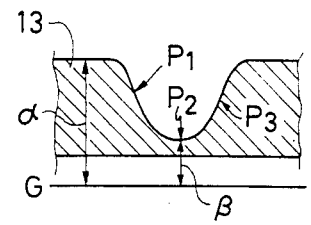
FIG. 5    FIG. 6    FIG. 7
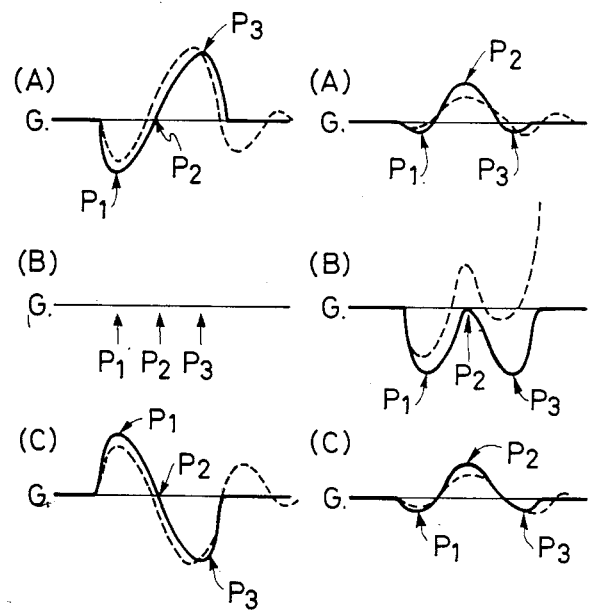 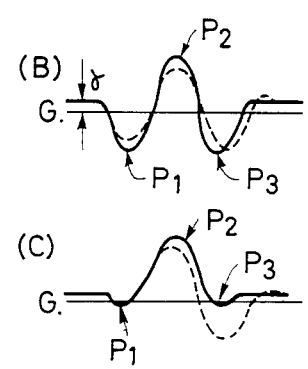

OPTICAL READING/REPRODUCING APPARATUS

BACKGROUND OF THE INVENTION

The present invention relates to controlling the focus of an optical reading/reproducing apparatus such as a compact disc (CD) player, and more particularly to an astigmatism method using a half-mirror.

Systems for detecting the focal point of an optical reading/reproducing apparatus can be represented by astigmatism methods which employ a half-mirror as disclosed in Japanese Provisional Publication No. 57013/1981 and Japanese Provisional Publication No. 167863/1984. According to the conventional astigmatism methods, in general, the direction of focal line of light spot on the light detector is in many cases tilted by 45 degrees with respect to a track direction (hereinafter referred to as track) which is formed on the disc surface to store the data as shown in FIG. 1. That is, FIG. 1 illustrates the conventional arrangement of light detectors 10 and a focus signal detector circuit in an astigmatism system for detecting focus. In this system, the direction of focal line (indicated by dotted lines in FIG. 1) of a light spot is tilted by 45 degrees with respect to the track direction 14 on the light detector, and a dividing line (hereinafter referred to as divide-into-four line) for dividing the light detector, 10 into four regions is arranged to be zero degree with respect to the track direction.

In the case of the half-mirror system, however, if the inclination of the direction of the focal line is set at 45 degrees, the axis of light emission of the laser diode defines an angle of 45 degrees with respect to a direction in which a pickup unit moves. Furthermore, if the axis of an optical detector system is horizontally arranged with respect to the disc using a reflecting mirror or the like in order to reduce the thickness of the pickup unit, the structure becomes so complex that it is made very difficult to mount optical parts and the mold a casing that contains the optical parts.

SUMMARY OF THE INVENTION

The present invention is to provide an apparatus which is free from the above-mentioned defects, permits optical parts to be arranged on a plane, permits the parts to be easily mounted, permits the apparatus to be easily constructed and molded, and enables the apparatus to be mass-produced in small sizes.

For this purpose according to the present invention, the inclination of the direction of focal line is selected to be zero degree with respect to the track direction or in parallel with the track direction, and the divide-into-four line of the light detector is arranged to be 45 degrees or near 45 degrees with respect to the track direction.

BRIEF DESCRIPTION OF THE DRAWINGS

FIG. 4 is a front view of a disc mold plane;

FIGS. 5 to 7(C) are diagrams of the waveforms of focus error signals; and

FIG. 8 is a diagram of a waveform of a disc data signal.

DETAILED DESCRIPTION OF THE PREFERRED EMBODIMENT

In order to eliminate the above-mentioned defects according to the present invention as will be understood from FIGS. 2 and 3, the direction of a focal line (indicated by a dotted line in FIG. 3) between the two focal lines of a light spot is set to be zero degree with respect to the track direction or in parallel with the track direction on the light detector (the other focal line is at right angles with the track direction as a matter of course, and only one focal line will be described hereinafter for the purpose of simplicity), and the divide-into-four line of the optical detector is arranged at an angle of about $45 \pm 10$ degrees with respect to the track direction on the disc surface. This makes it possible to arrange the optical parts on the same plane and to simplify the shape of the pickup unit. With the above-mentioned light detector arrangement, however, a problem newly arises as described below. The present invention is to solve this new problem by a method that will be described below.

Figure 3:
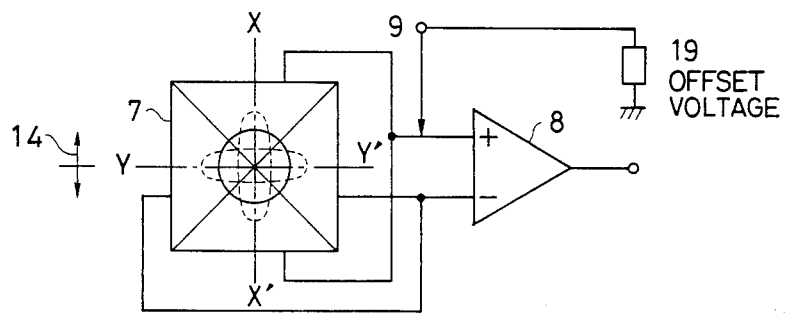
FIG. 3 is a diagram showing a focus signal detector circuit according to the embodiment of the present invention.

When the light detectors are arranged as shown in FIG. 3 without a circuit 19 according to the present invention, defects arise and are described below.

(1) When a light spot scans the pit trains formed in the tracks on the disc surface, focus error develops on a portion between the track and a mirror portion which exists between the track and the neighboring track.

(2) In a tracking system which drives the objective lens, focus error develops as the objective lens follows the trackin direction.

(3) When the disc has defects (such as bubbles, fingerprints, scars and the like that scatter the light) in the protect mold, performance to follow the track will be deteriorated.

With reference to the defect mentioned in (1) above, the focus error can be reduced to, for example, smaller than 0.3 $\mu$m even with the disc having a modulation degree of greater than 60%, by suitably setting the sensitivity for detecting the focus error.

With reference to the defect mentioned in (2) above, the focus error can be reduced to a negligibly small value by increasing the precision for feeding the pickup unit, and minimizing deviation in position between the objective lens and an optical system, other than the objective lens, which constitutes the pickup unit.

With reference to the defect (3), it was discovered that the focus error can be improved remarkably if the offset is electrically supplied to a focus servo loop in accordance with the present invention. To improve performance for following the disc having a defect of the sort mentioned in (3) reference is made to the following detailed description in conjunction with the drawings.

As a representative example, considered below is the case where dust has adhered on the disc surface. FIG. 4 shows a relationship in position between a light spot 12 and dust 11 on the surface of the protection mold of the disc. That is, the dust 11 on the surface of the protection mold passes through a portion (A) of the light spot on the mold surface in the order of $P_1$, $P_2$, $P_3$ as the reproduction of the disc continues. As the reproduction continues furthermore, the dust passes through portions (B)

and (C) in the same manner as mentioned above, and then finally passes outside the light spot. FIGS. 5 to 7 illustrate focus error signals of the case when the dust has passed through the light spot. Diagrams (A), (B) and (C) of FIGS. 5 to 7 represent the cases corresponded to the portions (A), (B) and (C) of FIG. 4. Solid line represent waveforms of when the objective les that always forms a focal point on the disc is simulated, and dotted lines represent practical responses of the servo loop.

FIG. 5 is a diagram showing waveforms obtained with the light detector arrangement according to a conventional art, and FIG. 6 is a diagram showing waveforms obtained with the light detector arrangement according to the present invention. According to the conventional example shown in FIG. 5, disturbance in the focus error signal caused by the dust becomes a maximum when the dust passes through the portions (A) and (C), the disturbance being generated in an S-shape. Therefore, the objective lens is defocused in a given direction at a portion $P_1$ and is then defocused in the opposite direction as the dust comes to a portion $P_3$ passed through a portion $P_2$. Namely, defocus of the objective lens is corrected. In the case of FIG. 6, disturbance in the focus error signal caused by the dust is small when the dust passes through the portions (A) and (C), and becomes a maximum when the dust passes through the portion (B), the disturbance being generated in a W-shape. Therefore, the objective lens is defocused in a given direction at the portion $P_1$, and is accelerated in the same direction as that of the portion $P_1$ as the dust comes to the portion $P_3$ passed through the portion $P_2$. After the dust has passed, the objective lens is greatly defocused. Depending upon the size of the dust, therefore, the objective lens is decocused until there exists no modulation degree. Accordingly, there exists no tracking signal for an extended period of time, and it becomes no more possible to follow the data track.

This is the defect inherent in the light detector arrangement of FIG. 3 without a circuit 19 as mentioned above. According to the present invention, the above-mentioned defect is improved by electrically supplying the offset voltage from the circuit 19 into the focus servo loop connected with the focus detector circuit shown in FIG. 3 of an optical disc device which employs the optical system of this light detector arrangement. That is, if the offset is electrically supplied to an offset terminal 9, for example, of FIG. 3, the waveforms shown in FIG. 6 change into focus error signal waveforms shown in FIG. 7. Described below is the case when the dust passes through the portion (B). With the offset being supplied, the deviation of focus offset that steadily generates durin9 the reproduction is, generally, denoted by $\gamma$. Here, if the dust arrives at the center of the light spot, a disc data signal 13 which is reproduced having a light quantity $\alpha$ at the time of reproduction decreases to a light quantity $\beta$ as denoted by the portion $P_2$ in FIG. 8. Accordingly, the gain of the focus servo loop decreases in proportion thereto, and the focus error signal increases owing to the offset as in the portion $P_2$ in the signal waveform when the dust passes through the portion (B) in FIG. 7.

Figure 1:
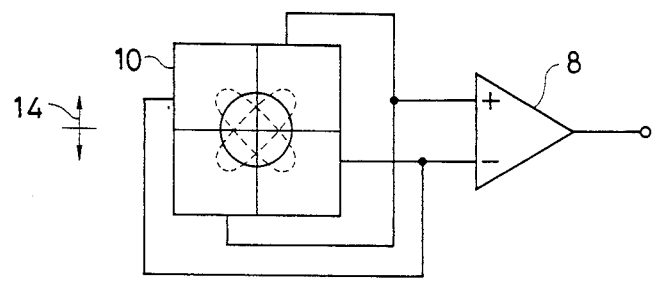
FIG. 1 is a diagram showing a focus signal detector circuit in a conventional apparatus.
Figure 2:
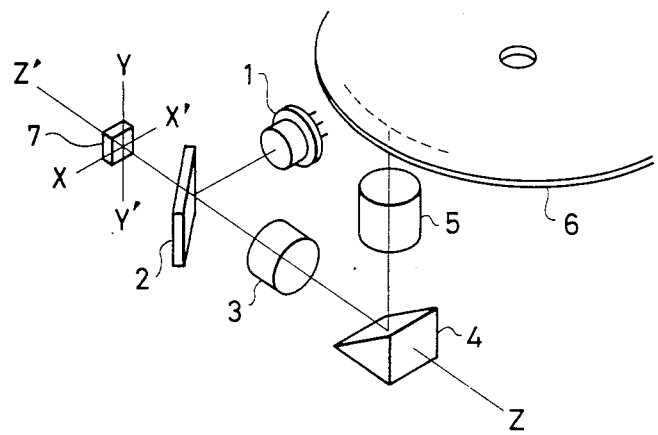
FIG. 2 is a perspective view showing the arrangement of optical parts in an apparatus according to an embodiment of the present invention.

Therefore, if a moment at which the dust passes through the portion (B) is taken into consideration, disturbance in the focus error signal at the portions $P_1$ and $P_3$ caused by the dust can be corrected by an offset voltage supplied at the portion $P_2$ relying upon, for example, the means shown in FIG. 2. Therefore, follow-up performance at defective portions of the disc can be greatly improved, i.e., can be more improved than that of the conventional light detector arrangement shown in FIG. 1.

An embodiment of the invention will now be described with reference to FIGS. 2 and 3. FIG. 2 shows an optical system of an optical reading/reproducing apparatus according to the embodiment. The quantity of light of a laser beam emitted in the X-direction from a semiconductor laser diode 1 is nearly halved through a half-mirror 2, bent by 90 degrees in the Z-direction, and falls on a collimating lens 3 so as to be collimated. The collimated laser beam is bent by 90 degrees in the Y-direction by a reflecting mirror 4, passes through an objective lens 5, falls on a disc 6 which is a data recording medium, reads the data that is stored, reflected thereby, returns back through the above-mentioned light path, and reaches the half-mirror 2. About one-half the quantity of light then passes through the half-mirror 2, and falls on a light detector 7 where the data that is read is converted into an electric signal. According to this embodiment, the feature resides in that the direction of focal line by the astigmatism effect of the half-mirror 2 is set to be zero degree with respect to the effective track direction of the disc or is set to be in parallel therewith, and the direction of the divide-into-four line of the light detector 7 is arranged to be about $45 \pm 10$ degrees with respect to the effective track direction of the disc. Accordingly, the semiconductor laser diode 1, half-mirror 2, collimating lens 3, reflecting mirror 4, and light detector 7 can be arranged on the same plane which is in parallel with, the disc surface, contributing to simplification of the method of mounting the optical parts, to simplification of the structure of a mechanism for feeding the optical image, to simplification of the shape of a casing of the optical reading apparatus in which the optical parts will be contained, to simplication of, the molding of the case, and to mass-production of the optical reading apparatuses in a small size.

FIG. 3 shows the focus error detector circuit according to this embodiment, wherein the sums of the opposing detectors of the light detector 7 divided into four in FIG. 3 are subtracted by an operational amplifier 8 in order to obtain a focus error detect signal. Here, the defects that arise when the direction of the divide-into-four line in the light detector arrangement of this embodiment is set to be 45 degrees with respect to the effective track direction of the disc, are eliminated by supplying the offset voltage from the circuit 19 into the offset terminal 9 of FIG. 3 as mentioned earlier.

As for the above-mentioned optical system of this embodiment, the offset voltage is poured into the focus error detector circuit as shown in FIG. 3, so that the laser beam is focused on the data surface of the disc. That is, when the laser beam is focused on the track of the disc surface by controlling the light detector to shift along the light axis of said detector, the light spot on the light detector is not equally distributed on the detectors divided into four, but is usually defocused by some distance within the limit of detectable extent of the light detector (in this embodiment, it is about 1.4 $\mu$m considered as the amount of displacement of the objective lens). According to this embodiment as described above, there is obtained an optical disc reproducing apparatus which is capable of reproducing signals from the disc in good condition and which exhibits sufficient follow-up performance even for the defects in the protection mold of the disc.

According to the present invention, the optical parts can be arranged on a plane contributing to simplify the method of mounting the optical parts, to simplify the structure of a casing in which the optical parts will be contained and to simply mold the casing. Therefore, optical reading/reproducing apparatuses can be mass-produced in a small size. Moreover, it is possible to cheaply provide an optical disc device which exhibits good follow-up performance for the defective disc, for example, which is capable of following the track even when there exists dust of greater than 1 mm in diameter on the disc surface.

The present invention can further be adapted to an optical reading/reproducing apparatus which does not have the reflecting mirror and which is vertically arranged relative to the disc, making it possible to provide an optical reading/reproducing apparatus at a further reduced cost.

Moreover, the light detector arrangement of the present invention can be adapted to other astigmatism systems than the half-mirror astigmatism system, to obtain improved follow-up performance for the defective discs.

What is claimed is:

1. In an optical reading/reproducing apparatus comprising: a light emitting element; a half-mirror which is located on and inclined with respect to a path of a light beam emitted from said light-emitting element so as to produce an astigmatism effect and to guide said light beam; an objective lens imaging the focal point of said light beam onto a track formed on the surface of a disc; and a light detector which reads the data on said disc via said light beam; the improvement wherein the direction of one of the focal lines on said light detector produced by the atigmatism effect of said half-mirror is set to be in parallel with the direction of the track formed on the surface of said disc.

2. An optical reading/reproducing apparatus according to claim 1, wherein the direction of a divide-into-four line of said light detector is inclinded by about 45 degrees with respect to the direction of the track on the surface of the disc, and means is provided so that the light spot formed by said light beam on said light detector is not equally distributed on the four-divided regions of said light detector, when said light beam is focused on said track.

3. An optical reading/reproducing apparatus according to claim 2, wherein means is provided to apply an offset signal to a focus servo loop connected with said light detector so that said light beam is focused on said track.

* * * * *